UNITED STATES PATENT OFFICE.

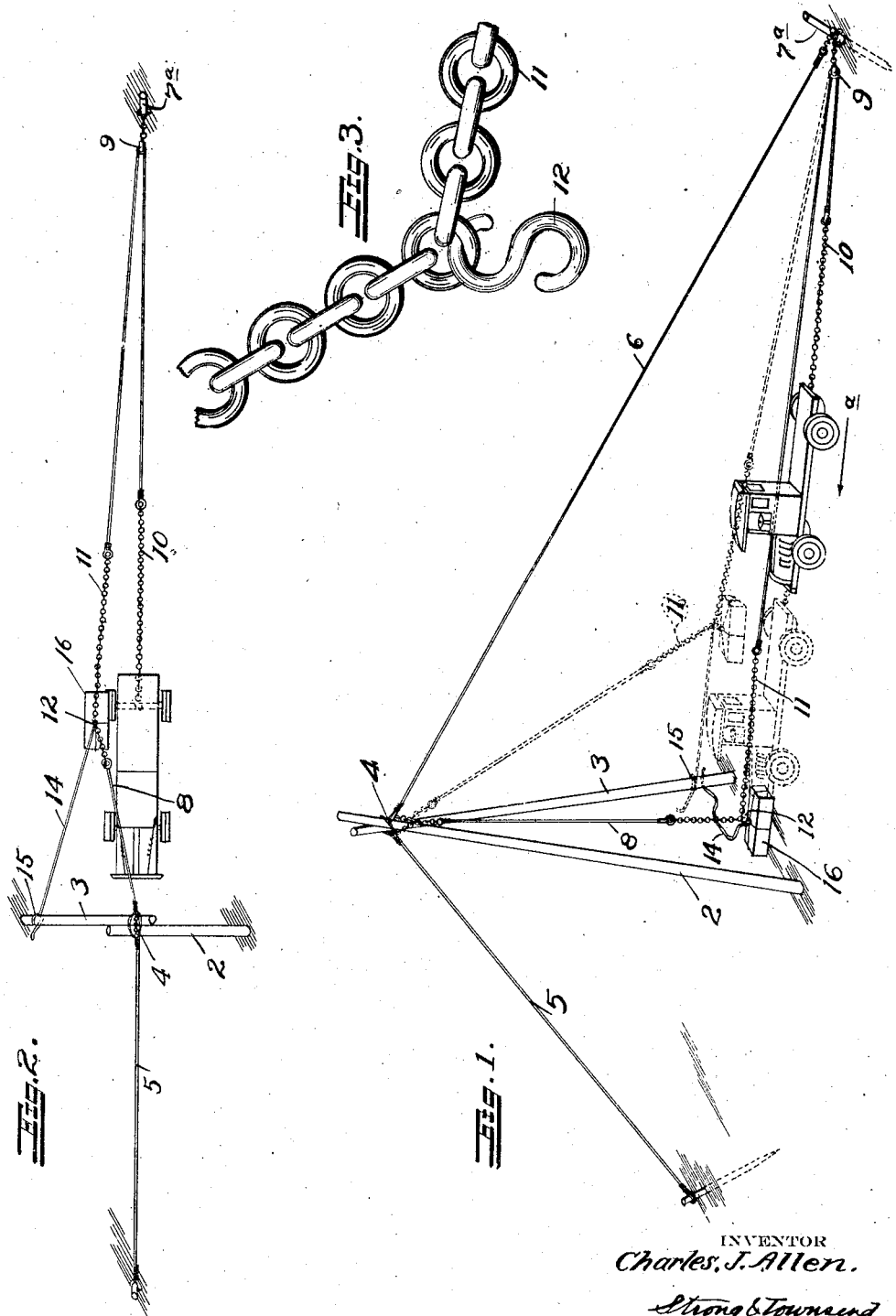

CHARLES J. ALLEN, OF SAN FRANCISCO, CALIFORNIA.

PORTABLE LOADING DEVICE.

1,378,576. Specification of Letters Patent. Patented May 17, 1921.

Application filed July 31, 1919. Serial No. 314,530.

*To all whom it may concern:*

Be it known that I, CHARLES J. ALLEN, a citizen of the United States, residing at the city and county of San Francisco and State of California, have invented new and useful Improvements in a Portable Loading Device, of which the following is a specification.

This invention relates to a portable loading device.

One of the objects of the present invention is to provide a simple and substantial portable loading device particularly adapted for loading motor trucks and other vehicles, said loading device employing the tractive power of the truck or vehicle to elevate the load to the body of the vehicle.

Another object of the invention is to provide a portable loading device which may be easily and quickly erected wherever desired. Further, a loading device which permits sliding or movement of the load within a reasonable range of the loader before elevating the same to the body of the vehicle.

Further objects will hereinafter appear.

The invention consists of the parts and the construction, combination and arrangement of parts as hereinafter more fully described and claimed, having reference to the accompanying drawings in which—

Figure 1 is a perspective view of the portable loader.

Fig. 2 is a plan view of the same.

Fig. 3 is an enlarged detail view of the lifting chain and the hooks attached thereto.

Referring to the drawings in detail, and particularly Fig. 1, it will be seen that the portable loader comprises a pair of masts 2 and 3 disposed on an angle with relation to each other, and suitably secured at their upper ends as at 4. The masts are held in a vertical position by a pair of guy lines 5 and 6 which are attached at their opposite ends to anchors buried in the ground or posts 7 such as here shown.

Secured to the upper end of the masts at the point indicated at 4, is a cable 8, and secured to the forward posts 7ª is a pulley 9 through which the cable is reeved. Secured to the free end of the cable is a section of chain as shown at 10 and placed in the cable at a point intermediate the fastening 4 and the pulley 9 is a chain section 11 to which is attached a lifting hook 12 (see Figs. 1 to 3). Also attached to the chain at a point adjacent the hook is a cable 14 which may be fastened to one of the masts as shown at 15. The function of this cable will hereinafter be described.

The loader here shown is particularly intended for loading motor trucks and the like and it is so designed that the tractive power of the truck may be utilized to move and elevate the load. For instance, if operating in a quarry a box such as shown at 16, filled with rock, soil, gravel or the like may be held in readiness to be placed upon a truck immediately upon its arrival. The load is elevated to the truck by merely hooking the chain section 10 to the rear end of the truck and fastening the hook 12 to the slings supporting the box 16. Forward movement of the truck under power in the direction of arrow *a* will straighten out the cable or swing the load from the full line position shown in Fig. 1 to the dotted line position, thus swinging it forward and at the same time elevating the load to a point where it is level with the receiving platform or bed of the truck. It is then only necessary to back up slightly with the truck to permit the load to settle into position and to permit release of the hook 12 or the slings supporting the box.

The load is thus quickly and easily elevated to position and comparatively little time is lost in loading the truck. Another box may be filled in the meantime so that it will be in readiness for the next truck arriving.

The loading of trucks and like vehicles will in this manner be quickly and easily accomplished and comparatively little time will be lost. In the course of loading it is desirable to shift the load to one side so as to permit the fore part of the truck to pass. In such an instance, the cable 14 may be attached to the load and by the forward movement of the main cable, the cable 14 will be simultaneously tightened and in this manner cause the load to swing to one side as shown in Fig. 2. This is of importance when loading trucks as it is desirable to swing the load to one side as the truck passes the load (see Fig. 1.) It is then only necessary to pay out on the cable 14 to permit the load to swing over the truck body in position to be received by the same. It is further possible to employ the loader and the truck to pull the load from one point to another of the ground surface and to swing it to either side by fastening the cable 14 to either one mast or the other. Again, it is possible to move the hook 12 from one link to another of the chain section 11, thus permitting adjustment of the load with relation to the lifting cable when loading.

The loader here shown is simple and substantial in construction and is capable of being erected wherever and whenever desired. While it is here shown as portable, it is obvious that it might be employed within a warehouse as it would then only be necessary to fasten the upper end of the cable 8 to a rafter or other suitable support near the roof of the building. I therefore do not wish to limit myself to the employment of masts alone as it is obvious that any other suitable elevated support might be employed.

Having thus described my invention, what I claim and desire to secure by Letters Patent is—

1. In a load lifting and transferring device, a cable, a derrick to which one end of the cable is attached above the load, a chain attached to the other end of said cable, a detachable hook by which the load is attached to the chain, a distant anchored pulley, a second cable passing about the pulley and having one end secured to the free end of the chain, a motor driven load carrier adapted to be attached to the other end of the last mentioned cable, said carrier being movable in a line between the pulley and load, and a rope extending from the load to one leg of the derrick, and adapted to act in unison with the other cables and chain in lifting and swinging the load to one side of the motor carrier, as said carrier moves forward.

2. In a load lifting and transferring device, a cable, a derrick to which one end of the cable is fixed above the load, means to attach the load to the cable, a distant anchored pulley around which the cable passes from the load, a motor driven load carrier adapted to be attached to the free end of the cable and movable in a line between the pulley and the load, and a rope extending transversely from the load to one leg of the derrick and acting in unison with the main cable to lift and swing the load to one side of the motor driven load carrier.

In testimony whereof I have hereunto set my hand in the presence of two subscribing witnesses.

CHARLES J. ALLEN.

Witnesses:
W. W. HEALEY,
M. E. EWING.